United States Patent [19]

Strandjord et al.

[11] Patent Number: 5,328,813
[45] Date of Patent: Jul. 12, 1994

[54] METHOD FOR THE PREPARATION OF OPTICAL RECORDING MEDIA CONTAINING OVERCOAT

[75] Inventors: Andrew J. G. Strandjord; Steven P. Webb, both of Midland, Mich.; Floyd E. Woodard, Los Altos, Calif.

[73] Assignee: The Dow Chemical Company, Midland, Mich.

[21] Appl. No.: 906,905

[22] Filed: Jun. 30, 1992

[51] Int. Cl.$^5$ .................................................. G11B 7/26
[52] U.S. Cl. ...................................... 430/321; 430/273; 430/945; 369/284; 204/192.26
[58] Field of Search .................. 430/321, 273, 945; 369/284; 204/192.26

[56] References Cited

U.S. PATENT DOCUMENTS

| | | | |
|---|---|---|---|
| 4,385,376 | 5/1983 | Takaoka | 369/284 |
| 4,461,807 | 7/1984 | Mori et al. | 428/469 |
| 4,500,889 | 2/1985 | Wada et al. | 346/1.1 |
| 4,548,889 | 10/1985 | Nemoto et al. | 430/273 |
| 4,658,388 | 4/1987 | Ishiwatari et al. | 369/13 |
| 4,666,759 | 5/1987 | Ohkawa et al. | 428/213 |
| 4,707,820 | 11/1987 | Sawamura | 369/284 |
| 4,726,858 | 2/1988 | Minemura et al. | 148/300 |
| 4,743,526 | 5/1988 | Ando et al. | 430/270 |
| 4,777,068 | 10/1988 | Omata et al. | 428/69 |
| 4,849,034 | 7/1989 | Uchiyama et al. | 428/694 |
| 4,861,656 | 8/1989 | Uchiyama et al. | 428/333 |
| 4,998,239 | 3/1991 | Strandjord et al. | 369/275.01 |
| 5,034,255 | 7/1991 | Shigematsu et al. | |
| 5,192,626 | 3/1993 | Sekiya et al. | 428/694 |

FOREIGN PATENT DOCUMENTS 63-299984  12/1988  Japan ................................. 430/321

OTHER PUBLICATIONS

English Language Abstract of JP 1-271,936, Nakao, "Optical Information Recording Medium", Oct. 1989.

Primary Examiner—Charles L. Bowers, Jr.
Assistant Examiner—John A. McPherson
Attorney, Agent, or Firm—Bruce M. Kanuch

[57] ABSTRACT

Optical storage media based on ablative metals give improved stability and offer improved write-read characteristics when they are overcoated with inorganic oxide, nitride, carbide, hydride, oxynitride or carbohydride to a reflectivity of 40–80% at the media write/read wavelength. Preferably the metal and overcoat are applied by sputter-depositing.

6 Claims, 1 Drawing Sheet

METHOD FOR THE PREPARATION OF OPTICAL RECORDING MEDIA CONTAINING OVERCOAT

BACKGROUND OF THE INVENTION

The present invention relates generally to materials for optical storage of coded information and methods of fabricating such materials, and more particularly to performance enhancing and physically protecting overcoats for thin metal film materials which are designed specifically for optical information storage.

BACKGROUND INFORMATION

Optical data storage is quickly becoming a viable and often preferred option to magnetic storage. The promise of high data densities and archival stability has initiated the development of thin film optical media which can be substituted into applications for which magnetic technology is inadequate. Three of the media formats which are currently being developed for optical write-once applications include: discs for use with personal computers, cards for consumer information transfer (U.S. Pat. No. 4,567,585 and tape for archival mass data storage (U.S. Pat. No. 4,567,585).

Functionally, the basic performance criteria associated with these different media formats are very similar, the most important of which are data input sensitivity and archival stability. Information is stored in the write once systems as micron-sized optical "spots." These spots are typically created in a thin absorbing layer above a reflective metal layer or directly ablated from the metal layer within the medium using a focused laser beam as the writing source (pulsed, high power). It is a desirable property for an information storage medium to give clearly defined spots. The data are "read" by scanning a laser (CW, low power) over the written spots and monitoring the intensity of the reflected laser light. When the spots are clearly defined, the signal-to-noise ratio is improved.

Information can be placed on these optical memories in extremely high densities, the theoretical limit being determined by the absolute resolving power of a laser beam focused down to its diffraction-limited size ($\lambda/2NA$, wherein $\lambda$ is the wavelength of the laser and NA is the numerical aperture of the focusing beam optics). Presently, most read/write lasers being employed operate within a wavelength range of about 750 to about 830 nm. However, in order to increase memory density, shorter and shorter wavelength read/write lasers (down to 300 nm wavelength and less) are being tested throughout the industry.

The information stored in these write-once media is, in principle, capable of being optically accessed an infinite number of times, and then subsequently, electronically decoded, and presented in a format which is meaningful to the user.

Mechanically, there are differences among the tape, disc and card formats which make it difficult for one thin film system to work as a universal write-once active layer. For example, discs which are based on alloys of tellurium, selenium and/or their oxides have been developed as ablative write-once media using conventional sputtering technology. These discs are typically put together in a rigid, air-sandwiched construction to enhance environmental stability while maintaining compatibility with the ablative writing mechanism wherein the writing laser beam directly melts away the metal layer on contact.

Tape, on the other hand, is a nonrigid medium and must be flexible enough to accommodate motion around the small hubs and rollers associated with tape handling. Additionally, because tape is in constant frictional contact with itself and the roller mechanisms, optical tape must be abrasion resistant. This protection is best afforded by some type of thin film hard overcoat. However, most write-once media that have a hard overcoat in direct contact with the active layer are less sensitive to laser writing.

Cards, which traditionally have been considered low-end media, require many of the criteria associated with both tape and disc formats. Like discs, cards are rigid. When they are in the optical drive the media do not experience any of the same frictional or bending forces associated with tape media. Outside the drive, the media must be able to withstand the forces associated with external handling and storage Surface abrasion and bending are commonplace for media used in credit card applications. Often, though, cards are constructed by laminating optical thin film (tape) to rigid substrates.

There are other differences and similarities which exist between the three media formats, but due to the variety of potential thin film layers being developed as write-once media and the large number of diverse drive designs, many of the precise requirements for these three types of media are still in the process of being standardized. For example, media performance issues such as write sensitivity, carrier-to-noise ratio (CNR), data bit size, and reflectivity level will be dependent on the end-use for the specific system. No one thin film system has been able to meet all the criteria which are required to make the media compatible with the various media drives.

All of these optical media are similar in that they contain a thin film of an laser sensitive reflective material from which reflectance is measured. As noted above, tellurium and selenium alloys are among materials that have been used heretofore. This metal layer can be deposited by sputtering, vacuum evaporation, chemical plating or the like. In some cases, this metal layer (film) is overcoated with one or more semitransparent or transparent polymer layers.

In addition to the alloys of tellurium, selenium and/or their oxides, in 1991, U.S. Pat. No. 4,998,239 described the use of a soft metal alloy as reflective metal layer for information storage. This soft metal alloy is particularly well suited for manufacturing in sheet form and offers a very high degree of surface uniformity and reflectivity. The soft metal alloy is flexible and can be laid down on any of the three formats: tapes, cards or discs.

There are many performance criteria which a thin film system must meet in order to be used in optical storage applications. One requirement of all optical memory media is that the data must remain environmentally stable for a long period of time. This is especially true for those media which are being targeted for archival storage applications. For example, the optical tape standard set by CREO Inc., Vancouver, Canada, is for a 20-year media life in an office environment (20° C./50% RH). Premature aging of many thin film media has been shown to occur by several different mechanisms: 1) the active layer can degrade (oxidation, phase segregation) to make the media less sensitive to laser writing and/or increase the bit-error rate; 2) the written data spots can change with time (edge deformation, phase reversal), thus reducing the playback signals; and/or 3) the media can mechanically degrade due to wear and abrasion during media handling. Each of these forms of degradation have also been found to occur to some degree with the soft metal alloy media described above.

One form of environmental degradation which is observed in optical media is the loss of reflectivity as a function of time, temperature, and humidity. This type of degradation has been attributed to processes such as film evaporation, moisture condensation, alloy dissolution, or metal oxidation. Samples of the media have been observed to become very irregular in appearance-after being stored for extended periods of time (i.e., the surface shows reflective and non-reflective areas). This degradation is accelerated by elevated temperatures and humidities.

Other degradation is due to abrasion and wear. In tape applications, the soft metal alloy system described above adheres very well to polymer substrates but can be easily damaged by physical contact with harder materials.

Any solution to these environmental problems must not destroy the property of the medium to meet the following requirements. 1) resistance to wear which occurs from winding of the film upon itself; 2) flexibility; 3) laser writing sensitivity; and 4) a reflectivity of not less than about 40–45% at the wavelength of laser writing and reading, e.g. 830 nm.

SUMMARY OF THE INVENTION

It has now been discovered that reflective metal layers and partially oxidized metal layers for optical memory applications can be given an overcoat which is hard and which actually enhances the optical properties required for optical memory applications. These overcoats are vacuum-deposited (preferably sputtered), transparent or semi-transparent, hard inorganic metal oxides, nitrides, carbides, hydrides, carbohydrides or mixtures thereof. Two or more overcoats can be employed. The thickness of the overcoats ranges from about 50 to about 10,000 Å to achieve a reflectivity for the combination of the underlying metal layer and the overcoat of from about 40% to about 80% at the wavelength of laser writing and reading (about 300 to 850 nm) and currently preferably about 750 and about 850 nm.

In one embodiment, this invention provides an improved optical memory medium. This medium includes a solid substrate, a highly reflective (i.e., 40% or greater at the laser write/read wavelength, especially 750–850 nm), metal (or partially oxidized metal) sputter deposited layer adhered to at least one surface of the substrate and a vacuum deposited (preferably sputtered) overcoat layer. The overcoat is one or more hard transparent or semi-transparent metal oxides, nitrides, carbides, hydrides, carbohydrides, or mixtures thereof such as oxynitrides. This overcoat layer alters the reflectivity as a function of its thickness and refractive index and the thickness and refractive index of the underlying soft metal layer.

In another embodiment, a process for producing improved optical data storage media is provided. This process involves depositing a thin layer of highly reflective soft metal or partial metal oxide on a substrate, particularly by sputtering, to achieve a reflectance of at least 40% at the laser write/read wavelength of about 300 to about 850 nm. Thereafter, and especially directly thereafter, one or more hard transparent overcoats are sputter-deposited over the reflective metal or partial metal oxide, particularly by reactively sputtering a suitable metal or metal compound in a reactive gas including oxygen, nitrogen, hydrogen, and/or a mixture thereof. The sputtering of this second layer is conducted to yield a thickness of about 50 to about 10,000 Å and an overall reflectivity for the metal plus overcoat combination of from about 40 to about 80% at the laser write/read wavelength of about 300 to about 850 nm.

BRIEF DESCRIPTION OF THE DRAWINGS

This invention will be further described with reference being made to the accompanying drawings, in which.

DESCRIPTION OF THE PREFERRED EMBODIMENTS

The present optical recording media comprises a substrate having a thin film of laser sensitive, reflective soft metal or partially oxidized metal adhered to one or both sides, and a sputter-deposited transparent or semi-transparent metal oxide, nitride, carbide, hydride or carbohydride overcoat on top of the soft metal layer(s).

The substrates can be selected from solid materials such as rigid or reinforced plastic or glass or can be a flexible material such as a plastic. These substrates can be used per se, or they can include a surfacing coat known as a "subbing layer".

Typical substrates can range from rigid glass, epoxy and polycarbonate sheets to flexible polyester and polyimide films. Any of the substrate materials proposed for use in optical media heretofore known can be employed.

Examples of representative plastic materials include polyester films, especially polyethylene terephthalate (PET), polycarbonate, polyacrylate, polymethylmethacrylate, polystyrene, polyurethane, polyvinylchloride, polyimide and the like. Polyester, and especially polyethylene terephthalate, and polycarbonate are preferred plastics.

Examples of representative optional subbing layers include UV-cured acrylics and siloxanes; fluorocarbons, $SiO_2$, and the like. UV-cured acrylics are preferred because they do not decrease the performance of the media and improve the adhesion of metal to the substrate.

The substrates can be in a form suitable for forming discs, cards or tapes in film or sheet form ranging in thickness from about 0.25 mil to about 60 mil.

The metal layer is laser sensitive, i.e., when contacted with a laser the reflectivity of the layer is increased or decreased so as to contrast with the rest of the metal surface. That is, it is a metal layer which can be for example melted, or evaporated by a typical writing laser to yield readable (low reflective) spots on a highly reflective field. It is a layer having a reflectance of at least about 40% and preferably about 50 to about 75% at the laser write/read wavelength. The metal layer can be (and preferably is) partially oxidized as set forth in coincidentally filed U.S. patent application Ser. No. 07/906,906 which is incorporated by reference. When the term "metal" is used in this context, it shall include the partial oxides, as well. Metals which can be used include those reflective metals disclosed heretofore to be useful in optical memories such as selenium and/or tellurium and alloys containing a high proportion (greater than ½) of selenium and/or tellurium and oxides of these metals and alloys. Preferably, however, the metal is a highly reflective soft metal alloy. This soft metal alloy comprises at least 5% by weight of each of at least two metals selected from the group consisting of cadmium, indium, tin, antimony, lead, bismuth, magnesium, copper, aluminum, zinc and silver.

As examples (all are percent by weight), the soft metal alloy comprises about 5 to about 95% tin, about 5 to about 95% bismuth, and 0 to about 40% copper; about 5 to about 95% tin, about 5 to about 95% bismuth, 0 to about 49.9% silver; about 5 to about 95% cadmium, about 5 to about 95% zinc and 0 to about 49.9% silver; about 5 to about 95% zinc, about 5 to about 95% cadmium and 0 to about 10% magnesium; about 5 to about 95% bismuth, about 5 to about 95% cadmium and 0 to about 49.5% silver; about 0.1 to about 95% tin and about 5 to about 99.9% indium; about 5 to about 95% tin, about 5 to about 95% lead, and 0 to about 40% copper; about 5 to about 95% tin, about 5 to about 95% lead and 0 to 49.9% silver; about 40 to 94% tin, about 3 to about 30% antimony and about 3 to about 37% bismuth and about 0 to about 40% copper; at least about 8% tin and bismuth and at least one of Mg, Au, Fe, Cr, Mn, Cu, Ag and Ni (at least about 1%) wherein Bi is present in an amount greater than Mg, Au, Fe, Cr, Mn, Cu, Ag and Ni. Layering materials having these compositions are defined herein as "soft metal layers," "soft metal alloy layers," and "flexible metal alloy layers." A preferable alloy is made up of about 25 to about 90% tin, about 8 to about 60% bismuth and about 7 to 25% copper. The alloy is preferably made up of the partial oxide of an alloy of about 70 to about 75% tin, about 20 to about 25% bismuth and about 1 to about 5% copper.

Soft metal alloys which comprise predominantly tin, i.e., about 55 to about 80%; a major amount of bismuth, i.e., about 20 to about 35%; and an amount of copper, i.e., about 1 to about 10% can be used.

Those alloys are described in more detail in U.S. Pat. Nos. 4,998,239 and 5,016,240. These patents are incorporated by reference.

The soft metal alloy layer preferably is present in a uniform partially oxidized form. By "uniform" is meant that the degree of oxidation is substantially constant at any selected depth below the surface and that the degree of oxidation generally decreases as a function of the depth. This is because the surface oxygen content of the film can go up when the product is removed from the vacuum chamber and exposed to atmospheric oxygen.

Oxidation levels in the film are difficult to arrive at by mass balancing the added oxygen during oxidation deposition because the vacuum system is constantly removing gas (including all the gaseous oxidants employed herein) to some extent from the sputtering zone.

When a metal alloy layer is laid down without added oxidant, removed and equilibrated in air, it appears that there is about 0.5 to 0.6 atoms of oxygen present for each atom of tin (when tin is one of the components). Conversely, when too great a level of oxidant is present, there is about 0.7 to 0.8 atoms of oxygen per atom of tin. These ranges would appear to suggest an extremely narrow band of acceptable oxidation level. It is believed that useful levels of partial oxidation are broader than this range may suggest. In light of the extreme difficulties posed in determining and comparing these numbers accurately, it is considered that one way to define oxidation levels in these preferred metal layers is not by chemical constituency but rather by the optical properties of the films.

One indirect measure of oxidation level in these thin films of the present invention is reflectivity measured in situ in the deposition chamber before exposure of the film to atmospheric oxidation. At high oxidation levels, the metal layer appears brown and reflectance at 830 nm drops below useful levels. Suitable oxidation levels diminish the 830 nm reflectance of the film, as compared to film prepared under the same conditions without oxidant. Suitable levels of oxidation in the metal layer are achieved when $$\frac{\text{830 nm reflectance (with oxidant)}}{\text{830 nm reflectance (without oxidant)}}$$

ranges between 0.50 and 0.95, and especially between 0.60 and 0.85.

The metal layer is from about 75 Å in thickness to about 5,000 Å in thickness, preferably from about 100 Å to about 1,500 Å, and often from about 500 Å to about 1000 Å.

The inorganic overcoat which is applied over the metal or metal partial oxide reflective layer is one or more hard transparent or semi-transparent layers of oxide, nitride, carbide, hydride or carbohydride or mixture e.g., oxynitride of one or more metals selected from chromium, aluminum, bismuth, zinc, zirconium, tantalum, tin, tungsten, niobium, titanium, indium, silicon, vanadium, antimony and hafnium (i.e., Cr, Al, Bi, Zn, Zr, Ta, Sn, W, Nb, Ti, In, Si, V, Sb and Hf). Preferably, the overcoat is an oxynitride or nitride of Zr, Hf or Ta because of their ability to enhance the properties of the media. The thickness of such overcoat is selected so that the reflectivity of the media is maintained at or above the aforementioned level. The preferred thickness of the overcoat is less than about 10,000 Å i.e. about 50 to about 10,000 Å, but is transparent/semitransparent to the extent that it does not reduce the reflectivity of the metal layer to below the desired 40% minimum reflectivity level.

During production, the reflectivity of the medium can be directly monitored in real time. The reflectivity value is a function of layer thickness and layer composition and can be, and often is, used as a parameter for process control decisions. Currently, 750 to about 850 nm lasers are used routinely in read/write drives with 830 nm lasers being most common. Accordingly, the reflectance at 830 nm is a good measure of the character of the inorganic overcoats used in this invention. As shorter wavelength lasers are developed other wavelengths can be used to monitor the process, and establish acceptable reflectivity-based deposition parameters.

In the following discussions the laser is assumed to be 830 nm but lasers of shorter wavelength can also be used. Suitable overcoat layers are those that exhibit values for the ratio:

$$\frac{\text{830 nm reflectance (after overcoat)}}{\text{830 nm reflectance (before overcoat)}}$$

in the range between about 0.6 and about 0.95, especially about 0.60 and about 0.85, with overall reflectivity for the metal plus overcoat being from about 40% to about 80% and especially about 45% to about 70% at 830 nm or other suitable laser wavelength of from about 300 to about 850 nm.

The overcoated optical memory media products of this invention have very desirable properties which adapt them well for tape, card or disc applications. These properties include an overall reflectance of at least 40%, or preferably over about 45% and up to about 70 or 80% at the laser read/write wavelength such as 830 nm.

The media of the invention exhibit a laser light write threshold of less than about 5.0 njoules/bit at 10 milliwatts laser power, preferably less than about 3 njoules and especially less than about 2.5 njoules; a modulation depth at 250 nsec/10 milliwatt laser power of at least about 45% and preferably at least about 75% and especially at least about 95%; and a carrier-to-noise level of at least about 40 dBs and especially at least about 45 dBs and especially at least about 50 dBs at 250 nsec/10 milliwatt laser power and a 30 kHz bandwidth.

The product is also characterized by giving more regular, better defined laser written spots than achievable when no overcoat is present. The laser written spots are essentially discrete micron-sized spots with a continuous smooth edge. They are not fractured or fractal (spidery).

The metal layer and the overcoat layer are laid down in a vacuum coating process preferably sputter-depositing. Sputter depositing is a commercial process for depositing inorganic materials, metals, oxides, and the like, on surfaces. Representative descriptions of sputter depositing processes and equipment may be found in U.S. Pat. Nos. 4,204,942 and 4,948,087 which are incorporated by reference. A schematic view of a representative sputtering system is provided in FIG. 1 and will be described in and prior to Example 1.

In sputtering, a voltage is applied to a metal or metal compound sputtering cathode in the presence of a reactive or nonreactive gas to create a plasma. The action of the sputtering gas plasma on the cathode causes atoms of the cathode (source) to be dislodged and to travel to and deposit upon a substrate positioned adjacent to the sputtering source.

Typically the sputtering gas is a noble gas such as krypton or argon or the like. Argon is the most common sputtering gas because of its attractive cost. It is also known in the art to employ from about 1% to about 90% by volume of one or more reactive gases as components of a sputtering gas mixture but not in the practice of this invention.

When a reactive gas is present it can cause a metal to be deposited as an oxide (when an oxygen source is present), a nitride (when a nitrogen source is present) and the like. This reactive sputtering process is well known and used commercially.

As applied to the present invention, the reflective metal may be deposited using a sputtering gas which includes an oxygen source, i.e., an oxidative sputtering gas to give a partial oxide.

The overcoat layer is deposited using a zirconium, tantalum, or the like, cathode and a sputtering gas including oxygen, nitrogen, hydrogen, a gaseous carbon compound, or a hydrocarbon to give the desired oxide, nitride or the like. Nitrogen and mixtures of oxygen and nitrogen are preferred components of reactive sputtering gas mixtures. A target made up of an inorganic compound such as silicon carbide can also be used with or without added reactive gas (for example, hydrogen) to deposit, for example, silicon carbide or silicon carbonhydride.

This invention will be further described with reference to the accompanying examples. These are provided to illustrate the invention but are not to be construed as limiting its scope.

These experiments were all carried out in a continuous sputtering machine. The sputtering equipment used was a research-sized coater for 13.5-inch-wide web. A simplified schematic of the web coating system is shown as System 10 in FIG. 1. System 10 includes vacuum chamber 12 which is evacuated via line 14. Contained within chamber 12 is a drive mechanism for moving a sheet of flexible plastic substrate 16 past a series of magnetron sputtering stations 50, 48, 46. The drive mechanism includes feed roll 18, idlers 20, 22, 24, 26, 28, 30 and 32 and take-up roll 34.

The film passes around chilled idler drum 36 as well. The film passes a pair of monitors for determining its transmittance, 38, and reflectance, 40, before coating and a similar pair of monitors 42 and 44 after coating. This coater is configured to simultaneously sputter coat up to three layers on a 13.5-inch-wide web using three separate DC magnetron cathodes 46, 48 and 50. Typically, cathode 46 is used to lay down the reflective metal layer, usually as a particle oxide. Cathode 48 can be used to lay down the hard overcoat. Also located in the system is a pre-glow station 52 for ionized gas cleaning or surface modifying of the substrate before coating. Each of these four stations is isolated from each other in space as a mini-chamber; thereby producing a local environment for the containment of the various plasma gasses. This allows separate processes to be carried out simultaneously at each station with variations in atmosphere from station to station but without cross-contamination among the four sources (see FIG. 2).

Figure 1:
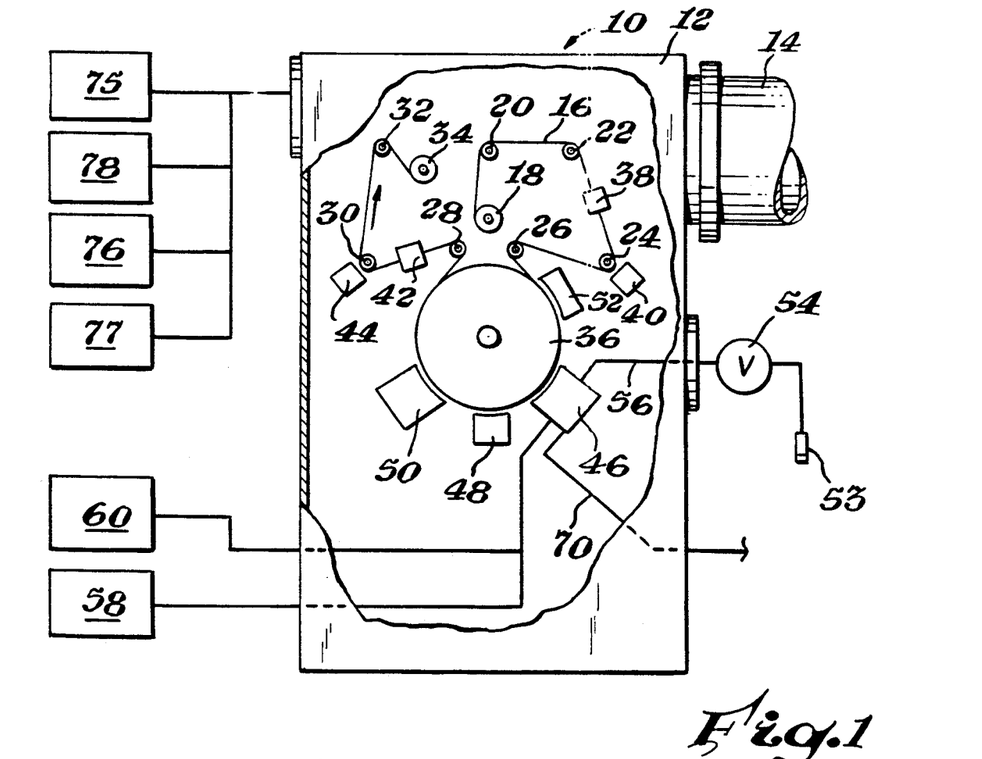
FIG. 1 is a schematic cross-section of a magnetron sputtering machine capable of producing the products of this invention.
Figure 2:
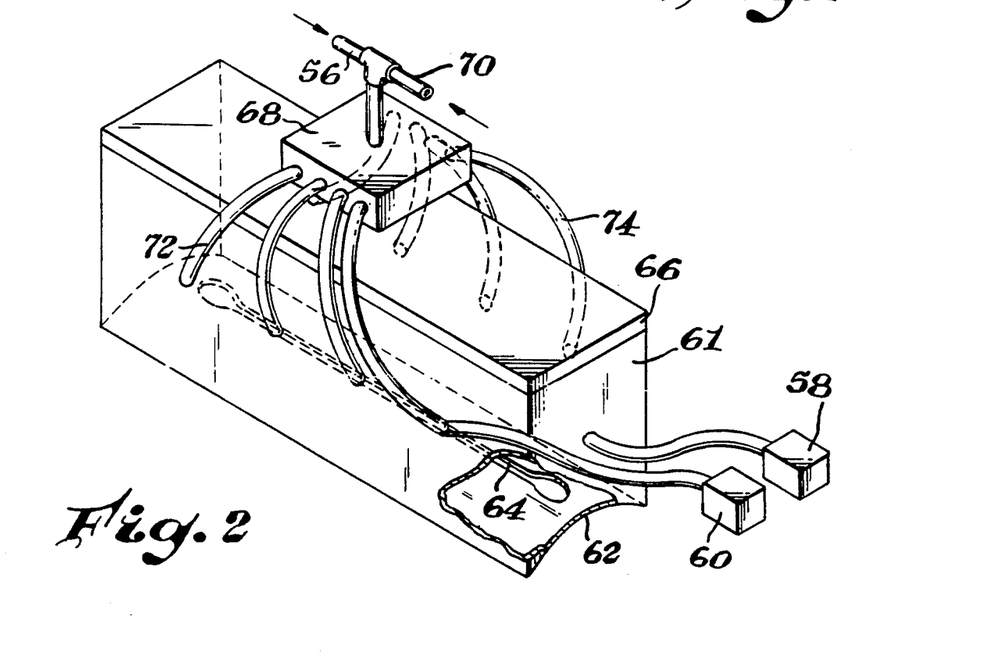
FIG. 2 is a cut-away perspective view of a sputtering cathode mini-chamber useful in a sputtering machine as depicted in FIG. 1.

As shown in FIG. 2, a typical mini-chamber such as 46 includes a housing 61 with a curved side 62 which conforms to the contour of idler drum 36 (FIG. 1). This side 62 contains a slit 64 through which the sputter deposited alloy is conveyed onto the substrate that moves past it. The mini-chamber 46 has a cathode 66 made of the ablative reflective material and a manifold 68 which supplies sputtering gas (argon) from line 70 and preferably mixes it with oxidant gas such as oxygen gas, supplied from vessel 53 via valve 54 and line 56 and distributes this mixture in its sputtering zone via line 72-74, etc. In the mini-chamber(s) for laying down the overcoat(s), the cathode 66 is zirconium, hafnium, tantalum, or the like, and line 56 supplies reactive gas (oxidant, a nitrogen source, carbon source or hydrogen source) as called for to yield the desired oxide, nitride, etc.

The control and monitoring of the sputtering system are normally accomplished using equipment and sensors which are standard in this coating machine. These are shown in FIG. 1 and include: 75, mass flow controllers (MKS) for regulation of gas flow into the cathode minichambers; 76, DC power (5-10 kilowatt) supplies (Advanced Energy) for all three sputtering cathodes; 77, an optical monitoring system (Hexatron/Southwall Technologies) which measures both reflectance and transmission of the film over the spectral region from 300 to 2000 nm; and 78, a film motion control system (Drivex) which regulates the tension, speed, and distance of the film as it moves through the system.

In addition to this equipment, the chamber 46 was fitted with an optical emission spectrometer (OES) 60 and a residual gas analyzer (RGA) 58 for in situ monitoring of the composition of the gas in the plasma (see FIGS. 1 and 2). The process parameters are equipment sensitive and may vary from equipment to equipment or even on the same equipment from day to day. Thus, before making the media of the present invention, the equipment should be calibrated before use.

The experiments were carried out using the following protocol for experimental sample preparation:

1) the chamber was set up:
   a) a plastic (usually PET) substrate film was loaded into the chamber,
   b) the chamber was evacuated to $1-2 \times 10^{-5}$ Torr,
   c) sputtering gas (argon) flow rates to the various mini-chambers were initiated,
   d) the oxidant gas valve feeding the mini-chamber having the reflective metal cathode was opened to give a desired ratio of argon to oxidant source within the reflective metal depositing mini-chamber, with oxygen being the common oxidant source,
   e) in the use of the overcoat sputtering mini-chamber, the reactant gas valve was opened to give a ratio of argon to reactant gas within the mini-chamber suitable for forming the desired transparent or semitransparent oxide, nitride, etc., overcoat.
   f) the film reels were set in motion,
   g) the pre-glow station was turned on,
   h) the cathode power was set and turned on for the metal layer deposit,
   i) the cathode power was set and turned on for the overcoat,
   j) the various parameters (1c–i) were adjusted to give the desired reflectivity level,
2) the system was allowed to equilibrate for a period of time,
3) 10 to 20 feet of film was coated with the reflective metal layer and the overcoat,
4) the power to the metal cathode was turned off for a short period of time to leave a region on the film which was coated with just the overcoat,
5) the power to the overcoat was turned off for a short period of time to leave a blank region on the film, as a marker to identify the end of "sample",
6) new system parameters were set (1c–j),
7) the plasmas were then reignited and the cycle repeated (2–7) until the film was used up or the experiments were complete, and then
8) the film was removed from the vacuum chamber and cut into sections for analysis.

Using the protocol outlined above, a set of preparations were carried out to demonstrate the effect of metal oxide, nitride, etc., overcoats on sputter-deposited optical storage products.

Examples and Comparative Tests

A 13.5-inch-wide web-coating machine described above was used to sputter-deposit soft metal alloy as reflective metal onto polymeric substrate materials. The sputtering target ($5'' \times 15.5'' \times 0.25''$) comprised an alloy, in percentage by weight, of Sn (about 65- to about 80), Bi (about 13 to about 30), and Cu (about 1 to about 7). The alloy composition may have varied within these limits from test to test. The substrate was 3-mil PET film unless otherwise noted in the following table. The chamber was evacuated to about a pressure of $2 \times 10^{-5}$ Torr, then back-filled with argon gas to a pressure of about $1.07 \times 10^{-3}$ Torr, and then with water vapor or oxygen to a total pressure (as shown in the Table) and power (as shown in the Table) was applied to the magnetron sputtering source. The substrate was translated in front of the sputtering source at a certain rate (reel speed as shown in the Table) so as to allow for a coating of the alloy to be deposited onto the substrate.

The overcoat sputtering chamber containing an overcoat target was then back-filled with argon gas to a pressure of about $1.2 \times 10^{-3}$ Torr, and then with a reactive gas if used to a total pressure (as shown in the Table). A DC power source (as shown in the Table) was applied to the magnetron sputtering source of the overcoat target. The substrate was translated in front of the sputtering sources at a rate (as shown in Table) so as to allow for a coating of the partially oxidized alloy and the overcoat to be deposited onto the substrate.

Various characteristics of the overcoated medium were measured and reported in the Table. The characteristics include: reflectance at 830 nm (shown in the Table); a laser light write threshold in njoules/bit at 10 milliwatts laser power; modulation depth at 250 nsec/10 milliwatt laser power; a carrier-to-noise level in dBs at 250 nsec/10 milliwatt laser power/30 kHz frequency analyzer bandwidth/30 fps medium speed.

The laser-written spots shapes were improved over those achieved with the non-overcoated Comparative Test samples. These tests are summarized in the following Table. In the Table, the second column indicates the nature of the overcoat, and the third column, the target used for the overcoat. The target used for the reflective film, as described previously herein, is referred to as FMP. In a few examples, more than one overcoat was used either over the FMP layer or with the FMP layer being sandwiched between them. These tests are indicated in the table in the overcoat column by the designation of the order of layering down the layers. See, for example, the test sample no. 82. SiCxHy/FMP/SiCxHy which indicates: siliconcarbohydride coating on the substrate followed by the FMP coating over the silicon carbohydride followed by a second silicon carbohydride coating over the FMP layer.

TABLE

| Sample # | Overcoat | Sputtering Target | Cathode Power (Watts) | Oxygen Flow Rate (sccm) | Nitrogen Flow Rate (sccm) | Hydrogen Flow Rate (sccm) | Argon/Gas Flow Rate (sccm) | Mini-Chamber Pressure (mTorr) | Water Valve (Micrometer Setting) | Reel Speed (mm/sec) |
|---|---|---|---|---|---|---|---|---|---|---|
| 1 | ZrNx | Zr  | 3500 | 0.0 | 18.0 | — | 6.7 | 2.70 | — | 8.0 |
|   |      | FMP | 390  | 3.5 | 0.0  | — | 8.6 | 2.38 | — | 8.0 |
| 2 | ZrNx | Zr  | 3500 | 0.0 | 20.0 | — | 6.7 | 3.00 | — | 8.0 |
|   |      | FMP | 390  | 3.5 | 0.0  | — | 8.6 | 2.36 | — | 8.0 |
| 3 | ZrNx | Zr  | 3500 | 0.0 | 22.0 | — | 6.7 | 3.32 | — | 8.0 |
|   |      | FMP | 400  | 3.5 | 0.0  | — | 8.6 | 2.36 | — | 8.0 |
| 4 | ZrNx | Zr  | 3500 | 0.0 | 24.0 | — | 6.7 | 3.32 | — | 8.0 |
|   |      | FMP | 400  | 3.5 | 0.0  | — | 8.6 | 2.36 | — | 8.0 |

TABLE-continued

| | | | | | | | | | | |
|---|---|---|---|---|---|---|---|---|---|---|
| 5 | ZrNx | Zr | 3500 | 0.0 | 26.0 | — | 6.7 | 3.60 | — | 8.0 |
| | | FMP | 400 | 3.5 | 0.0 | — | 8.6 | 2.39 | — | 8.0 |
| 6 | ZrNx | Zr | 3500 | 0.0 | 28.0 | — | 6.7 | 3.93 | — | 8.0 |
| | | FMP | 400 | 3.5 | 0.0 | — | 8.6 | 2.38 | — | 8.0 |
| 7 | ZrNx | Zr | 3500 | 0.0 | 30.0 | — | 6.7 | 4.22 | — | 8.0 |
| | | FMP | 390 | 3.5 | 0.0 | — | 8.6 | 2.38 | — | 8.0 |
| 8 | ZrNx | Zr | 500 | 0.0 | 12.9 | — | 6.7 | — | — | 8.0 |
| | | FMP | 360 | 3.5 | 0.0 | — | 8.6 | 2.38 | — | 8.0 |
| 9 | ZrNx | Zr | 1500 | 0.0 | 14.8 | — | 6.7 | 2.70 | — | 8.0 |
| | | FMP | 370 | 3.5 | 0.0 | — | 8.6 | 2.33 | — | 8.0 |
| 10 | ZrNx | Zr | 2500 | 0.0 | 16.4 | — | 6.7 | 2.70 | — | 8.0 |
| | | FMP | 370 | 3.5 | 0.0 | — | 8.6 | 2.32 | — | 8.0 |
| 11 | ZrNx | Zr | 3500 | 0.0 | 18.1 | — | 6.7 | 2.70 | — | 8.0 |
| | | FMP | 390 | 3.5 | 0.0 | — | 8.6 | 2.33 | — | 8.0 |
| 12 | ZrNx | Zr | 4500 | 0.0 | 19.5 | — | 6.7 | 2.70 | — | 8.0 |
| | | FMP | 420 | 3.5 | 0.0 | — | 8.6 | 2.32 | — | 8.0 |
| 13 | ZrNx | Zr | 5500 | 0.0 | 20.9 | — | 6.7 | 2.70 | — | 8.0 |
| | | FMP | 460 | 3.5 | 0.0 | — | 8.6 | 2.30 | — | 8.0 |
| 14 | ZrNx | Zr | 6500 | 0.0 | 22.6 | — | 6.7 | 2.70 | — | 8.0 |
| | | FMP | 490 | 3.5 | 0.0 | — | 8.6 | 2.30 | — | 8.0 |
| 15 | ZrNx | Zr | 6500 | 0.0 | 21.0 | — | 6.7 | 2.36 | — | 8.0 |
| | | FMP | 490 | 3.5 | 0.0 | — | 8.7 | 2.35 | — | 8.0 |
| 16 | ZrNx | Zr | 6500 | 0.0 | 23.0 | — | 6.7 | 2.70 | — | 8.0 |
| | | FMP | 490 | 3.5 | 0.0 | — | 8.7 | 2.35 | — | 8.0 |
| 17 | ZrNx | Zr | 6500 | 0.0 | 25.0 | — | 6.7 | 3.07 | — | 8.0 |
| | | FMP | 490 | 3.5 | 0.0 | — | 8.7 | 2.37 | — | 8.0 |
| 18 | ZrNx | Zr | 6500 | 0.0 | 27.0 | — | 6.7 | 3.43 | — | 8.0 |
| | | FMP | 490 | 3.5 | 0.0 | — | 8.7 | 2.35 | — | 8.0 |
| 19 | ZrNx | Zr | 6500 | 0.0 | 29.0 | — | 6.7 | 3.75 | — | 8.0 |
| | | FMP | 490 | 3.5 | 0.0 | — | 8.7 | 2.35 | — | 8.0 |
| 20 | ZrNx | Zr | 6500 | 0.0 | 31.0 | — | 6.7 | 4.10 | — | 8.0 |
| | | FMP | 490 | 3.5 | 0.0 | — | 8.7 | 2.40 | — | 8.0 |
| 21 | ZrNx | Zr | 6500 | 0.0 | 33.0 | — | 6.7 | 4.38 | — | 8.0 |
| | | FMP | 490 | 3.5 | 0.0 | — | 8.7 | 2.35 | — | 8.0 |
| 22 | TaOxNg | Ta | 3000 | 0.0 | 46.3 | — | 17.0 | 2.66 | — | 6.0 |
| | | FMP | 400 | 3.5 | — | — | 8.9 | 2.39 | — | 6.0 |
| 23 | TaOxNg | Ta | 3000 | 3.0 | 46.3 | — | 17.0 | 2.82 | — | 6.0 |
| | | FMP | 400 | 3.5 | — | — | 8.9 | 2.44 | — | 6.0 |
| 24 | TaOxNg | Ta | 3000 | 6.0 | 46.3 | — | 17.0 | 3.04 | — | 6.0 |
| | | FMP | 400 | 3.5 | — | — | 8.9 | 2.42 | — | 6.0 |
| 25 | TaOxNg | Ta | 3500 | — | 18.0 | — | 6.7 | 2.22 | — | 8.0 |
| | | FMP | 390 | 3.5 | — | — | 8.6 | 2.28 | — | 8.0 |
| 26 | TaOxNg | Ta | 3500 | — | 20.0 | — | 6.7 | 2.68 | — | 8.0 |
| | | FMP | 390 | 3.5 | — | — | 8.6 | 2.29 | — | 8.0 |
| 27 | TaOxNg | Ta | 3500 | — | 22.0 | — | 6.7 | 3.06 | — | 8.0 |
| | | FMP | 390 | 3.5 | — | — | 8.6 | 2.30 | — | 8.0 |
| 28 | TaOxNg | Ta | 3500 | — | 24.0 | — | 6.7 | 3.40 | — | 8.0 |
| | | FMP | 390 | 3.5 | — | — | 8.6 | 2.31 | — | 8.0 |
| 29 | TaOxNg | Ta | 3500 | — | 26.0 | — | 6.7 | 3.72 | — | 8.0 |
| | | FMP | 390 | 3.5 | — | — | 8.6 | 2.33 | — | 8.0 |
| 30 | TaOxNg | Ta | 3500 | — | 28.0 | — | 6.7 | 4.06 | — | 8.0 |
| | | FMP | 400 | 3.5 | — | — | 8.6 | 2.32 | — | 8.0 |
| 31 | TaOxNg | Ta | 3500 | — | 30.0 | — | 6.7 | 4.35 | — | 8.0 |
| | | FMP | 400 | 3.5 | — | — | 8.6 | 2.33 | — | 8.0 |
| 32 | TaOxNg | Ta | 500 | — | 13.3 | — | 6.7 | 2.70 | — | 8.0 |
| | | FMP | 370 | 3.5 | — | — | 8.7 | 2.30 | — | 8.0 |
| 33 | TaOxNg | Ta | 1500 | — | 15.6 | — | 6.7 | 2.70 | — | 8.0 |
| | | FMP | 360 | 3.5 | — | — | 8.7 | 2.32 | — | 8.0 |
| 34 | TaOxNg | Ta | 2500 | — | 17.7 | — | 6.7 | 2.70 | — | 8.0 |
| | | FMP | 370 | 3.5 | — | — | 8.6 | 2.33 | — | 8.0 |
| 35 | TaOxNg | Ta | 3500 | — | 20.0 | — | 6.7 | 2.70 | — | 8.0 |
| | | FMP | 390 | 3.5 | — | — | 8.6 | 2.34 | — | 8.0 |
| 36 | TaOxNg | Ta | 4500 | — | 22.5 | — | 6.7 | 2.70 | — | 8.0 |
| | | FMP | 440 | 3.5 | — | — | 8.6 | 2.30 | — | 8.0 |
| 37 | TaOxNg | Ta | 5500 | — | 24.5 | — | 6.7 | 2.70 | — | 8.0 |
| | | FMP | 490 | 3.5 | — | — | 8.6 | 2.30 | — | 8.0 |
| 38 | NbNx | Nb | 5500 | 0 | 37.0 | — | 0 | 4.10 | — | 8.0 |
| | | FMP | 380 | 3.5 | 0 | — | 8.6 | 2.37 | — | 8.0 |
| 39 | HfNx | Hf | 3500 | 0 | 16.0 | — | 6.7 | 2.60 | — | 8.0 |
| | | FMP | 380 | 3.5 | 0 | — | 8.7 | 2.43 | — | 8.0 |
| 40 | HfNx | Hf | 3500 | 0 | 14.0 | — | 6.7 | 2.23 | — | 8.0 |
| | | FMP | 380 | 3.5 | 0 | — | 8.7 | 2.36 | — | 8.0 |
| 41 | HfNx | Hf | 3500 | 0 | 18.0 | — | 6.7 | 2.95 | — | 8.0 |
| | | FMP | 390 | 3.5 | 0 | — | 8.7 | 2.38 | — | 8.0 |
| 42 | HfNx | Hf | 3500 | 0 | 20.0 | — | 6.7 | 3.30 | — | 8.0 |
| | | FMP | 390 | 3.5 | 0 | — | 8.7 | 2.40 | — | 8.0 |
| 43 | HfNx | Hf | 3500 | 0 | 22.0 | — | 6.7 | 3.60 | — | 8.0 |
| | | FMP | 390 | 3.5 | 0 | — | 8.7 | 2.40 | — | 8.0 |
| 44 | HfNx | Hf | 3500 | 0 | 24.0 | — | 6.7 | 3.90 | — | 8.0 |
| | | FMP | 390 | 3.5 | 0 | — | 8.7 | 2.40 | — | 8.0 |
| 45 | HfNx | Hf | 3500 | 0 | 26.0 | — | 6.7 | 4.20 | — | 8.0 |
| | | FMP | 390 | 3.5 | 0 | — | 8.7 | 2.40 | — | 8.0 |

TABLE-continued

| | | | | | | | | | | |
|---|---|---|---|---|---|---|---|---|---|---|
| 46 | HfNx | Hf | 3500 | 0 | 28.0 | — | 6.7 | 4.50 | — | 8.0 |
| | | FMP | 400 | 3.5 | 0 | — | 8.7 | 2.40 | — | 8.0 |
| 47 | HfNx | Hf | 3500 | 0 | 30.0 | — | 6.7 | 4.80 | — | 8.0 |
| | | FMP | 400 | 3.5 | 0 | — | 8.7 | 2.40 | — | 8.0 |
| 48 | TiNx | Ti | 3500 | 0 | 20.0 | — | 6.7 | 3.17 | — | 8.0 |
| | | FMP | 320 | 3.5 | 0 | — | 8.7 | 2.40 | — | 8.0 |
| 49 | TiNx | Ti | 3500 | 0 | 15.0 | — | 6.7 | 2.40 | — | 8.0 |
| | | FMP | 310 | 3.5 | 0 | — | 8.7 | 2.36 | — | 8.0 |
| 50 | TiNx | Ti | 3500 | 0 | 25.0 | — | 6.7 | 3.90 | — | 8.0 |
| | | FMP | 340 | 3.5 | 0 | — | 8.7 | 2.40 | — | 8.0 |
| 51 | TiNx | Ti | 4500 | 0 | 20.0 | — | 6.7 | 2.90 | — | 8.0 |
| | | FMP | 310 | 3.5 | 0 | — | 8.7 | 2.40 | — | 8.0 |
| 52 | TiNx | Ti | 5500 | 0 | 20.0 | — | 6.7 | 2.70 | — | 8.0 |
| | | FMP | 290 | 3.5 | 0 | — | 8.7 | 2.40 | — | 8.0 |
| 53 | TiNx | Ti | 6500 | 0 | 20.0 | — | 6.7 | 2.40 | — | 8.0 |
| | | FMP | 270 | 3.5 | 0 | — | 8.7 | 2.40 | — | 8.0 |
| 54 | SnOx | Sn | 4979 | 56.3 | — | — | 7.2 | 4.9 | — | 10.0 |
| | | FMP | 661 | — | — | — | 6.4 | 1.06 | 0 | |
| 55 | SnOx | Sn | 4979 | 56.0 | — | — | 7.2 | 4.9 | — | 10.0 |
| | | FMP | 740 | — | — | — | 6.4 | 1.15 | 20 | |
| 56 | SnOx | Sn | 5003 | 55.6 | — | — | 7.2 | 4.9 | — | 10.0 |
| | | FMP | 903 | — | — | — | 6.4 | 1.38 | 40 | |
| 57 | SnOx | Sn | 4966 | 55.5 | — | — | 7.2 | 4.9 | — | 10.0 |
| | | FMP | 980 | — | — | — | 6.4 | 1.50 | 50 | |
| 58 | SnOx | Sn | 4964 | 55.4 | — | — | 7.2 | 4.9 | — | 10.0 |
| | | FMP | 1238 | — | — | — | 6.4 | 1.68 | 60 | |
| 59 | SnOx | Sn | 4997 | 56.0 | — | — | 7.2 | 4.9 | — | 10.0 |
| | | FMP | 1638 | — | — | — | 6.4 | 2.04 | 80 | |
| 60 | SnOx | Sn | 7021 | 68.8 | — | — | 7.2 | 5.3 | — | 6.0 |
| | | FMP | 994 | — | — | — | 6.0 | 1.79 | 80 | |
| 61 | SnOx | Sn | 7021 | 68.8 | — | — | 7.2 | 5.3 | — | 3.25 |
| | | Sn | 6991 | 68.2 | — | — | 7.2 | 5.3 | — | 6.0 |
| | | FMP | 994 | — | — | — | 6.0 | 1.79 | 80 | |
| 62 | SnOx | Sn | 7021 | 68.8 | — | — | 7.2 | 5.3 | — | 1.30 |
| | | Sn | 6972 | 67.7 | — | — | 7.2 | 5.3 | — | 6.0 |
| | | FMP | 994 | — | — | — | 6.0 | 1.79 | 80 | |
| 63 | SnOx | Sn | 7000 | 65.8 | — | — | 7.2 | 5.15 | — | 2.11 |
| | | FMP | 338 | — | — | — | 6.0 | 1.59 | 50 | |
| 64 | SnOx | Sn | 7011 | 75.8 | — | — | 14.5 | 7.56 | — | 2.11 |
| | | FMP | 344 | — | — | — | 6.0 | 1.65 | 50 | |
| 65 | SnOx | Sn | 6002 | 79.2 | — | — | 29.9 | 10.58 | — | 2.11 |
| | | FMP | 340 | — | — | — | 6.0 | 1.75 | 50 | |
| 66 | SnOx | Sn | 5987 | 87.2 | — | — | 40.0 | 13.57 | — | 2.11 |
| | | FMP | 337 | — | — | — | 6.0 | 1.83 | 50 | |
| 67 | SnOx | Sn | 3485 | 42.7 | — | — | 7.3 | 4.0 | — | 6.0 |
| | | FMP | 986 | — | — | — | 6.0 | 1.76 | 80 | |
| 68 | SnOx | Sn | 1739 | 28.6 | — | — | 7.3 | 3.5 | — | 4.50 |
| | | FMP | 989 | — | — | — | 6.0 | 1.73 | 80 | |
| 69 | SnOx 376Å | Sn | 6735 | 65.7 | — | — | 7.2 | 5.5 | — | 10.0 |
| | | FMP | 990 | — | — | — | 6.4 | 1.5 | 50 | |
| 70 | SnOx 200Å | Sn | 3339 | 46.4 | — | — | 7.2 | 4.9 | — | 10.0 |
| | | FMP | 793 | — | — | — | 6.4 | 1.52 | 50 | |
| 71 | SnOx 100Å | Sn | 1662 | 36.8 | — | — | 7.2 | 4.9 | — | 10.0 |
| | | FMP | 689 | — | — | — | 6.4 | 1.52 | 50 | |
| 72 | SnOx | | 2561 | 35.0 | — | — | 7.2 | 3.6 | — | 7.0 |
| | | FMP | 995 | — | — | — | 6.0 | 1.85 | 80 | |
| 73 | SiNx | Si | 3483 | — | 36.4 | — | 39.4 | 8.0 | — | 5.0 |
| | | FMP | 378 | — | — | — | 6.4 | 1.56 | 40 | |
| 74 | SiNx | Si | 3470 | — | 36.7 | — | 39.5 | 8.0 | — | 5.0 |
| | | FMP | 467 | — | — | — | 6.4 | 1.69 | 50 | |
| 75 | SiNx | Si | 3470 | — | 36.6 | — | 39.5 | 8.0 | — | 5.0 |
| | | FMP | 540 | — | — | — | 6.4 | 1.82 | 60 | |
| 76 | SiOxNg | Si | 3481 | 8.0 | 32.8 | — | 39.5 | 8.0 | — | 5.0 |
| | | FMP | 382 | — | — | — | 6.4 | 1.55 | 40 | |
| 77 | SiOxNg | Si | 3487 | 8.0 | 32.9 | — | 39.5 | 8.0 | — | 5.0 |
| | | FMP | 467 | — | — | — | 6.4 | 1.66 | 50 | |
| 78 | SiOxNg | Si | 3487 | 8.0 | 33.0 | — | 39.5 | 8.0 | — | 5.0 |
| | | FMP | 563 | — | — | — | 6.4 | 1.80 | 60 | |
| 79 | SiCxHy | SiC | 3976 | — | — | 20.0 | 54.4 | 7.63 | — | 6.0 |
| | | FMP | 528 | — | — | — | 6.4 | 1.68 | 40 | |
| 80 | SiCxHy | SiC | 3976 | — | — | 20.0 | 54.4 | 7.62 | — | 6.0 |
| | | FMP | 638 | — | — | — | 6.4 | 1.81 | 50 | |
| 81 | SiCxHy | SiC | 3976 | — | — | 20.0 | 54.4 | 7.60 | — | 6.0 |
| | | FMP | 638 | — | — | — | 6.4 | 1.96 | 60 | |
| 82 | SiCxHy | Si | 3975 | — | — | 20.0 | 54.5 | 7.5 | — | 6.0 |
| | | FMP | 591 | — | — | — | 6.4 | 1.81 | 50 | |
| | | Si | 3986 | — | — | — | 54.5 | 7.16 | — | 6.0 |
| 83 | InOx | In | 5070 | 37.3 | 4.0 | 14.0 | 4.5 | 4.1 | — | 12.0 |
| | | FMP | 945 | — | — | — | 6.4 | 1.39 | 50 | |

TABLE-continued

| | | | | | | | | | | |
|---|---|---|---|---|---|---|---|---|---|---|
| | | In | 5095 | 31.8 | 4.0 | 14.0 | 4.5 | 4.1 | — | 12.0 |
| 84 | ZrOxNg | Zr | 3880 | 3.3 | 42.9 | — | 67.5 | 8.3 | — | 7.0 |
| | | FMP | 432 | — | — | — | 4.0 | 1.86 | 50 | |
| | | Zr | 3920 | 3.3 | 42.9 | — | 67.5 | 8.2 | — | 7.0 |
| 85 | SnOx | Sn | 3314 | 46.5 | — | — | 7.2 | 4.9 | — | 10.0 |
| | | FMP | 740 | — | — | — | 6.4 | 1.47 | 50 | |
| | | Sn | 3332 | 42.1 | — | — | 7.2 | 4.9 | — | 10.0 |
| 86 | ZrOxNy | Zr | 3910 | 2.0 | 25.4 | — | 40.0 | 7.42 | — | 5.0 |
| | | Zr | 98 | — | — | — | 19.1 | 2.47 | — | 5.0 |
| | | FMP | 370 | — | — | — | 6.4 | 1.55 | 50 | |
| 87 | ZrOxNy | Zr | 3910 | 2.0 | 25.0 | — | 40.0 | 7.40 | — | 10.0 |
| | | Zr | 98 | — | — | — | 19.1 | 2.47 | — | 5.0 |
| | | FMP | 370 | — | — | — | 6.4 | 1.55 | 50 | |
| 88 | SnOx ZnOxNy | Sn | 2484 | 35.3 | — | — | 7.2 | 4.3 | — | 14.0 |
| | | Zr | 4000 | 3.3 | 42.9 | — | 67.5 | 8.3 | — | |
| | | FMP | 985 | — | — | — | 4.0 | 1.79 | 40 | |
| 89 | SnOx ZnOxNy | Sn | 2480 | 35.4 | — | — | 7.2 | 4.3 | — | 14.0 |
| | | Zr | 3980 | 3.3 | 42.9 | — | 67.5 | 8.3 | — | |
| | | FMP | 1091 | — | — | — | 4.0 | 1.91 | 50 | |
| 90 | SnOx ZnOxNy | Sn | 2486 | 35.4 | — | — | 7.2 | 4.3 | — | 14.0 |
| | | Zr | 4000 | 3.3 | 42.9 | — | 67.5 | 8.3 | — | |
| | | FMP | 985 | — | — | — | 4.0 | 2.09 | 60 | |
| 91 | SnOx ZnOxNy | Sn | 2476 | 35.1 | — | — | 7.2 | 4.3 | — | 14.0 |
| | | Zr | 4000 | 3.3 | 42.9 | — | 67.5 | 8.3 | — | |
| | | FMP | 1092 | — | — | — | 4.0 | 2.23 | 70 | |
| 92 | SiCHx ZrOxNy | SiC | 3987 | — | — | 20.0 | 45.9 | 7.7 | — | 10.0 |
| | | Zr | 3870 | 3.3 | 42.8 | — | 62.8 | 8.3 | — | |
| | | FMP | 780 | — | — | — | 4.0 | 2.13 | 50 | |
| 93 | SiCHx ZrOxNy | SiC | 3979 | — | — | 20.0 | 45.9 | 7.7 | — | 10.0 |
| | | Zr | 3950 | 6.6 | 42.8 | — | 62.8 | 8.5 | — | |
| | | FMP | 773 | — | — | — | 4.0 | 2.12 | 50 | |
| 94 | SiCHx ZrOxNy | SiC | 3985 | — | — | 20.0 | 45.9 | 7.6 | — | 10.0 |
| | | Zr | 3820 | 0.0 | 42.8 | — | 62.8 | 8.1 | — | |
| | | FMP | 770 | — | — | — | 4.0 | 2.12 | 50 | |
| 95 | TaNy | Ta | 2977 | 0.0 | 36.5 | — | 14.0 | 2.74 | — | 6.0 |
| | | FMP | 541 | — | — | — | 5.7 | 2.03 | 50 | |
| 96 | TaOxNy | Ta | 2987 | 3.0 | 36.5 | — | 14.0 | 2.96 | — | 6.0 |
| | | FMP | 539 | — | — | — | 5.7 | 2.05 | 50 | |
| 97 | TaOxNy | Ta | 2980 | 6.0 | 36.5 | — | 14.0 | 3.24 | — | 6.0 |
| | | FMP | 539 | — | — | — | 5.7 | 2.05 | 50 | |
| 98 | TaOxNy | Ta | 2972 | 3.0 | 36.5 | — | 14.0 | 3.11 | — | 6.0 |
| | | FMP | 532 | — | — | — | 5.7 | 2.07 | 50 | |
| 99 | InOx | In | 5099 | 36.0 | 4.0 | 14.0 | 4.5 | 4.1 | — | 12.0 |
| | | FMP | 937 | — | — | — | 6.4 | 1.34 | 40 | |
| 100 | InOx | In | 5062 | 36.9 | 4.0 | 14.0 | 4.5 | 4.1 | — | 12.0 |
| | | FMP | 930 | — | — | — | 6.4 | 1.36 | 40 | |
| 101 | InOx | In | 5117 | 36.8 | 4.0 | 14.0 | 4.5 | 4.1 | — | 12.0 |
| | | FMP | 938 | — | — | — | 6.4 | 1.45 | 50 | |
| 102 | InOx | In | 5097 | 36.8 | 4.0 | 14.0 | 4.5 | 4.1 | — | 12.0 |
| | | FMP | 1039 | — | — | — | 6.4 | 1.61 | 60 | |
| 103 | TiOxNy | Ti | 4482 | 3.0 | 30.0 | — | 14.0 | 5.60 | — | 5.0 |
| | | FMP | 369 | — | — | — | 6.0 | 2.05 | 50 | |
| 104 | TiOxNy | Ti | 4483 | 8.0 | 30.0 | — | 14.0 | 6.78 | — | 5.0 |
| | | FMP | 413 | — | — | — | 6.0 | 2.04 | 50 | |
| 105 | ZrNx | Zr | 3760 | — | 46.2 | — | 67.5 | 8.3 | — | 5.0 |
| | | FMP | 457 | — | — | — | 4.0 | 1.91 | 50 | |
| 106 | ZrNx | Zr | 3730 | — | 46.9 | — | 67.5 | 8.3 | — | 4.0 |
| | | FMP | 362 | — | — | — | 4.0 | 1.92 | 50 | |
| 107 | ZrOx | Zr | 3380 | 16.5 | — | — | 40.7 | 6.93 | — | 2.11 |
| | | FMP | 392 | — | — | — | 6.0 | 1.85 | 55 | |
| 108 | ZrOx | Zr | 3390 | 16.5 | — | — | 40.7 | 7.13 | — | 2.11 |
| | | Zr | 3380 | 16.5 | — | — | 40.7 | 6.93 | — | 2.11 |
| | | FMP | 392 | — | — | — | 6.0 | 1.85 | 55 | |
| 109 | ZrOx | Zr | 5040 | 16.5 | — | — | 19.2 | 3.75 | — | 5.0 |
| | | FMP | 385 | — | — | — | 6.4 | 1.47 | 40 | |
| 110 | ZrOx | Zr | 5040 | 15.8 | — | — | 19.2 | 3.75 | — | 5.0 |
| | | FMP | 388 | — | — | — | 6.4 | 1.61 | 50 | |
| 111 | ZrOx | Zr | 4774 | 16.2 | — | — | 19.2 | 3.75 | — | 5.0 |
| | | FMP | 494 | — | — | — | 6.4 | 1.77 | 60 | |
| 112 | ZrOxNy | Zr | 4140 | 2.0 | 25.6 | — | 40.0 | 7.45 | — | 6.0 |
| | | FMP | 742 | — | — | — | 6.0 | 2.02 | 80 | |
| 113 | ZrOxNy | Zr | 3930 | 2.0 | 25.2 | — | 40.0 | 7.44 | — | 5.0 |
| | | FMP | 420 | — | — | — | 6.4 | 1.46 | 40 | |
| 114 | ZrOxNy | Zr | 3900 | 2.0 | 25.3 | — | 40.0 | 7.43 | — | 5.0 |
| | | FMP | 490 | — | — | — | 6.4 | 1.69 | 50 | |

TABLE-continued

| | | | | | | | | | | |
|---|---|---|---|---|---|---|---|---|---|---|
| 115 | ZrOxNy | Zr | 3910 | 2.0 | 26.0 | — | 40.0 | 7.43 | — | 5.0 |
| | | FMP | 489 | — | — | — | 6.4 | 1.78 | 60 | |
| 116 | ZrOxNy | Zr | 3900 | 2.0 | 25.4 | — | 40.0 | 7.43 | — | 10.0 |
| | | FMP | 581 | — | — | — | 6.4 | 1.67 | 50 | |
| 117 | ZrOxNy | Zr | 3820 | 3.3 | 44.0 | — | 67.5 | 8.3 | — | 7.0 |
| | | FMP | 604 | — | — | — | 4.0 | 1.94 | 50 | |
| 118 | ZrOxNy | Zr | 3830 | 3.3 | 45.1 | — | 67.5 | 8.3 | — | 4.0 |
| | | FMP | 455 | — | — | — | 4.0 | 1.95 | 50 | |
| 119 | ZrOxNy | Zr | 3870 | 3.3 | 42.7 | — | 67.5 | 8.3 | — | 7.0 |
| | | FMP | 603 | — | — | — | 4.0 | 2.05 | 50 | |
| 120 | ZrOxNy | Zr | 3870 | 3.3 | 43.1 | — | 67.5 | 8.3 | — | 7.0 |
| | | FMP | 595 | — | — | — | 4.0 | 1.94 | 50 | |
| 121 | ZrOxNy | Zr | 3860 | 3.3 | 44.2 | — | 67.5 | 8.3 | — | 7.0 |
| | | FMP | 600 | — | — | — | 4.0 | 1.90 | 50 | |
| 122 | ZrOxNy | Zr | 3860 | 3.3 | 43.4 | — | 67.5 | 8.3 | — | 7.0 |
| | | FMP | 600 | — | — | — | 4.0 | 1.89 | 50 | |
| 123 | ZrOxNy | Zr | 3860 | 3.3 | 43.5 | — | 67.5 | 8.3 | — | 7.0 |
| | | FMP | 602 | — | — | — | 4.0 | 1.88 | 50 | |
| 124 | ZrOxNy | Zr | 3990 | 3.3 | 43.8 | — | 67.5 | 8.3 | — | 7.0 |
| | | FMP | 546 | — | — | — | 4.0 | 1.93 | 50 | |

| Sample # | Overcoat | Sputtering Target | In Situ Spectral Reflectivity (% @ 830 nm) | Static Reflectivity (%) | Static Transmission (%) | Static Absorption (%) | Laser Write Sensitivity (nanoseconds) | Modulation Depth (% @ 0.20 Zero) | C/N (dB's) |
|---|---|---|---|---|---|---|---|---|---|
| 1 | ZrNx | Zr | 44.6 | 45.62 | 15.91 | 38.47 | 160 | 105 | 49 |
| | | FMP | | | | | | | |
| 2 | ZrNx | Zr | 44.6 | 45.50 | 16.20 | 38.30 | 160 | 97 | 48 |
| | | FMP | | | | | | | |
| 3 | ZrNx | Zr | 45.3 | 45.90 | 15.21 | 38.89 | 150 | 97 | 48 |
| | | FMP | | | | | | | |
| 4 | ZrNx | Zr | 45.1 | 45.43 | 15.50 | 39.07 | 170 | 89 | 48 |
| | | FMP | | | | | | | |
| 5 | ZrNx | Zr | 44.8 | 45.20 | 15.25 | 39.55 | 180 | 88 | 48 |
| | | FMP | | | | | | | |
| 6 | ZrNx | Zr | 44.6 | 44.70 | 15.34 | 39.96 | 150 | 88 | 48 |
| | | FMP | | | | | | | |
| 7 | ZrNx | Zr | 45.1 | 45.67 | 15.16 | 39.16 | 140 | 88 | 48 |
| | | FMP | | | | | | | |
| 8 | ZrNx | Zr | 45.1 | 43.15 | 18.10 | 38.75 | 170 | 71 | 42 |
| | | FMP | | | | | | | |
| 9 | ZrNx | Zr | 45.2 | 44.64 | 16.41 | 38.95 | 170 | 88 | 44 |
| | | FMP | | | | | | | |
| 10 | ZrNx | Zr | 44.8 | 44.64 | 16.54 | 38.82 | 140 | 88 | 45 |
| | | FMP | | | | | | | |
| 11 | ZrNx | Zr | 45.5 | 46.45 | 15.81 | 38.37 | 145 | 102 | 48 |
| | | FMP | | | | | | | |
| 12 | ZrNx | Zr | 45.2 | 46.07 | 13.59 | 40.33 | 170 | 103 | 50 |
| | | FMP | | | | | | | |
| 13 | ZrNx | Zr | 44.9 | 45.98 | 11.68 | 42.34 | 150 | 105 | 54 |
| | | FMP | | | | | | | |
| 14 | ZrNx | Zr | 43.2 | 45.43 | 10.80 | 43.77 | 150 | 105 | 54 |
| | | FMP | | | | | | | |
| 15 | ZrNx | Zr | 43.0 | 45.22 | 10.47 | 44.31 | — | 94 | 48 |
| | | FMP | | | | | | | |
| 16 | ZrNx | Zr | 43.2 | 45.38 | 10.90 | 43.72 | — | 105 | 52 |
| | | FMP | | | | | | | |
| 17 | ZrNx | Zr | 43.0 | 45.29 | 11.06 | 43.65 | — | 108 | 52 |
| | | FMP | | | | | | | |
| 18 | ZrNx | Zr | 43.6 | 46.08 | 11.47 | 42.44 | — | 110 | 53 |
| | | FMP | | | | | | | |
| 19 | ZrNx | Zr | 43.6 | 45.68 | 11.59 | 42.73 | — | 108 | 51 |
| | | FMP | | | | | | | |
| 20 | ZrNx | Zr | 43.5 | 45.73 | 11.74 | 42.52 | — | 105 | 49 |
| | | FMP | | | | | | | |
| 21 | ZrNx | Zr | 43.5 | 45.74 | 11.84 | 42.42 | — | 105 | 48 |
| | | FMP | | | | | | | |
| 22 | TaOxNg | Ta | — | 48.05 | 9.49 | 42.47 | 190 | 104 | 52 |
| | | FMP | | | | | | | |
| 23 | TaOxNg | Ta | — | 47.24 | 10.62 | 42.14 | 190 | 102 | 51 |
| | | FMP | | | | | | | |
| 24 | TaOxNg | Ta | — | 48.38 | 11.04 | 40.58 | 190 | 97 | 49 |
| | | FMP | | | | | | | |
| 25 | TaOxNg | Ta | 44.8 | 46.51 | 13.42 | 40.07 | 210 | 87 | 47 |
| | | FMP | | | | | | | |
| 26 | TaOxNg | Ta | 45.5 | 46.79 | 14.11 | 39.10 | 190 | 105 | 52 |
| | | FMP | | | | | | | |
| 27 | TaOxNg | Ta | 45.4 | 46.18 | 14.56 | 39.27 | 180 | 103 | 50 |
| | | FMP | | | | | | | |
| 28 | TaOxNg | Ta | 45.2 | 46.14 | 14.97 | 38.40 | 180 | 103 | 48 |
| | | FMP | | | | | | | |
| 29 | TaOxNg | Ta | 45.0 | 46.15 | 15.19 | 38.66 | 175 | 100 | 47 |

TABLE-continued

| | | | | | | | | | |
|---|---|---|---|---|---|---|---|---|---|
| 30 | TaOxNg | FMP Ta | 45.4 | 46.68 | 14.69 | 38.63 | 180 | 97 | 46 |
| 31 | TaOxNg | FMP Ta | 45.3 | 46.34 | 14.98 | 38.68 | 185 | 95 | 45 |
| 32 | TaOxNg | FMP Ta | 45.6 | 45.18 | 16.97 | 37.85 | 190 | 60 | 39 |
| 33 | TaOxNg | FMP Ta | 44.9 | 45.01 | 16.89 | 37.90 | 180 | 70 | 40 |
| 34 | TaOxNg | FMP Ta | 45.2 | 45.92 | 16.18 | 37.90 | 180 | 97 | 45 |
| 35 | TaOxNg | FMP Ta | 44.6 | 46.11 | 16.18 | 38.92 | 180 | 105 | 51 |
| 36 | TaOxNg | FMP Ta | 45.0 | 46.35 | 11.54 | 42.11 | 200 | 95 | 47 |
| 37 | TaOxNg | FMP Ta | 42.8 | 44.68 | 9.67 | 45.65 | 200 | 86 | 46 |
| 38 | NbNx | FMP Nb | 47.5 | 46.93 | 13.86 | 39.21 | — | 80 | 49 |
| 39 | HfNx | FMP Hf | 45.3 | 45.50 | 15.97 | 38.53 | — | 100 | 47 |
| 40 | HfNx | FMP Hf | 45.2 | 45.15 | 16.05 | 38.80 | — | 100 | 50 |
| 41 | HfNx | FMP Hf | 45.2 | 45.62 | 16.18 | 38.20 | — | 100 | 45 |
| 42 | HfNx | FMP Hf | 45.3 | 44.97 | 16.33 | 38.70 | — | 100 | 43 |
| 43 | HfNx | FMP Hf | 45.4 | 45.18 | 16.42 | 38.40 | — | 97 | 42 |
| 44 | HfNx | FMP Hf | 45.0 | 44.37 | 17.30 | 38.33 | — | 95 | 40 |
| 45 | HfNx | FMP Hf | 44.9 | 44.07 | 17.59 | 38.34 | — | 95 | 40 |
| 46 | HfNx | FMP Hf | 45.6 | 44.40 | 16.63 | 38.97 | — | 95 | 40 |
| 47 | HfNx | FMP Hf | 45.1 | 44.20 | 17.51 | 38.29 | — | 95 | 39 |
| 48 | TiNx | FMP Ti | 44.8 | 43.06 | 18.77 | 38.17 | — | 74 | 46 |
| 49 | TiNx | FMP Ti | 44.7 | 43.29 | 19.00 | 37.71 | — | 76 | 47 |
| 50 | TiNx | FMP Ti | 45.3 | 44.13 | 17.69 | 38.18 | — | 76 | 47 |
| 51 | TiNx | FMP Ti | 45.0 | 43.43 | 18.87 | 37.70 | — | 71 | 47 |
| 52 | TiNx | FMP Ti | 45.3 | 42.57 | 19.08 | 38.35 | — | 57 | 45 |
| 53 | TiNx | FMP Ti | 45.2 | 43.18 | 19.18 | 37.64 | — | 48 | 43 |
| 54 | SnOx | Sn | 49 | 47.13 | 11.53 | 41.33 | 600 | — | — |
| | | FMP | 66.7 | 61.92 | 7.71 | 30.37 | 880 | — | — |
| 55 | SnOx | Sn | 50.8 | 50.04 | 9.29 | 40.67 | 470 | — | 13 |
| | | FMP | 66.0 | 61.81 | 6.84 | 31.35 | 600 | — | — |
| 56 | SnOx | Sn | 48.8 | 48.20 | 8.76 | 43.04 | 240 | 42 | 42 |
| | | FMP | 61.4 | 58.26 | 6.97 | 34.77 | 300 | 47 | 41 |
| 57 | SnOx | Sn | 48.0 | 47.82 | 9.00 | 43.18 | 230 | 45 | 41 |
| | | FMP | 60.0 | 57.81 | 7.29 | 34.90 | 290 | 50 | 42 |
| 58 | SnOx | Sn | 48.7 | 48.96 | 8.12 | 42.92 | 210 | 30 | 40 |
| | | FMP | 60.9 | 59.65 | 6.24 | 34.11 | 300 | 13 | 33 |
| 59 | SnOx | Sn | 45.1 | 46.09 | 8.53 | 45.37 | 210 | 20 | 38 |
| | | FMP | 57.3 | 57.71 | 6.47 | 35.83 | 320 | 18 | 25 |
| 60 | SnOx | Sn | — | 13.47 | 25.54 | 60.99 | 610 | — | 41 |
| | | FMP | | | | | | | |
| 61 | SnOx | Sn | — | 47.50 | 14.84 | 37.65 | 640 | — | 10 |
| | | Sn FMP | | | | | | | |
| 62 | SnOx | Sn | — | — | — | — | 14000 | — | — |
| | | Sn FMP | | | | | | | |
| 63 | SnOx | Sn | — | — | — | — | 950 | — | — |
| | | FMP | | | | | | | |
| 64 | SnOx | Sn | 41.4 | — | — | — | 1400 | — | — |
| | | FMP | | | | | | | |
| 65 | SnOx | Sn | 39.3 | — | — | — | 990 | — | — |
| | | FMP | | | | | | | |
| 66 | SnOx | Sn | 41.8 | — | — | — | 990 | — | — |
| | | FMP | | | | | | | |
| 67 | SnOx | Sn | — | 35.51 | 18.24 | 46.25 | 200 | 45 | 44 |
| | | FMP | | | | | | | |
| 68 | SnOx | Sn | 48.2 | 47.64 | 11.21 | 41.15 | 180 | 35 | 42 |
| | | FMP | — | 55.86 | 9.22 | 34.92 | 220 | 41 | 43 |
| 69 | SnOx | Sn | 43.0 | 43.47 | 10.26 | 46.27 | 220 | 62 | 44 |

TABLE-continued

| | | | | | | | | | |
|---|---|---|---|---|---|---|---|---|---|
| | 376Å | FMP | 59.8 | 58.29 | 7.52 | 34.20 | 290 | 51 | 41 |
| 70 | SnOx 200Å | Sn | 50.0 | 48.43 | 12.76 | 38.82 | 220 | 77 | 44 |
| | | FMP | 55.9 | 52.98 | 11.61 | 35.41 | 240 | 54 | 44 |
| 71 | SnOx 100Å | Sn | 50.0 | 48.34 | 14.72 | 36.93 | 210 | 67 | 40 |
| | | FMP | 52.6 | 49.47 | 14.36 | 36.18 | 210 | 70 | 41 |
| 72 | SnOx | | 49.9 | — | — | — | — | — | — |
| | | FMP | — | — | — | — | — | 20 | 29 |
| 73 | SiNx | Si | 50.2 | 50.12 | 13.01 | 36.87 | 240 | 51 | 41 |
| | | FMP | 55.8 | 52.34 | 13.29 | 34.37 | 220 | 68 | 41 |
| 74 | SiNx | Si | 50.2 | 50.48 | 11.85 | 37.58 | 250 | 43 | 42 |
| | | FMP | 57.1 | 54.90 | 11.61 | 33.48 | 220 | 60 | 42 |
| 75 | SiNx | Si | 50.0 | 50.52 | 12.31 | 37.18 | 280 | 39 | 38 |
| | | FMP | 56.3 | 54.99 | 11.29 | 33.72 | 260 | 55 | 41 |
| 76 | SiOxNg | Si | 50.5 | 49.39 | 12.71 | 37.89 | 250 | 44 | 38 |
| | | FMP | 56.3 | 52.33 | 12.74 | 34.94 | 210 | 65 | 41 |
| 77 | SiOxNg | Si | 51.3 | 49.69 | 11.52 | 38.78 | 260 | 40 | 36 |
| | | FMP | 56.9 | 54.73 | 10.68 | 34.59 | 250 | 54 | 39 |
| 78 | SiOxNg | Si | 50.6 | 47.51 | 11.73 | 40.76 | 280 | 36 | 34 |
| | | FMP | 56.3 | 55.97 | 10.65 | 33.37 | 270 | 50 | 39 |
| 79 | SiCxHy | SiC | 50.0 | 48.35 | 7.08 | 44.58 | 210 | 44 | 40 |
| | | FMP | 61.4 | 58.47 | 6.64 | 34.89 | 310 | 36 | 37 |
| 80 | SiCxHy | SiC | 50.0 | 48.95 | 6.72 | 44.33 | 190 | 45 | 41 |
| | | FMP | 61.4 | 59.64 | 5.78 | 34.58 | 290 | 11 | 30 |
| 81 | SiCxHy | SiC | 49.5 | 48.65 | 9.07 | 42.27 | 190 | 64 | 43 |
| | | FMP | 59.5 | 57.42 | 7.64 | 34.94 | 250 | 40 | 38 |
| 82 | SiCxHy | Si | 49.4 | 47.50 | 8.48 | 44.02 | 260 | 9 | 32 |
| | | FMP | 61.2 | 59.29 | 7.44 | 33.27 | 590 | 0 | 20 |
| 83 | InOx | Si In | — | 49.28 | 10.44 | 40.28 | 280 | 23 | 38 |
| | | FMP | — | 55.80 | 6.20 | 35.00 | 360 | 12 | 29 |
| 84 | ZrOxNg | In Zr | — | 49.39 | 14.05 | 36.37 | 240 | 70 | 44 |
| | | FMP | — | | | | | | |
| 85 | SnOx | Zr Sn | 50.5 | 49.24 | 12.50 | 38.26 | 260 | 18 | 36 |
| | | FMP | 55.6 | 52.57 | 11.74 | 35.69 | 230 | 62 | 42 |
| 86 | ZrOxNy | Sn Zr | 44.9 | 44.3 | 13.57 | 42.00 | 210 | 74 | 43 |
| | | Zr FMP | | | | | | | |
| 87 | ZrOxNy | Zr | 52.0 | 51.04 | 12.24 | 36.73 | 250 | 47 | 39 |
| | | Zr FMP | | | | | | | |
| 88 | SnOx ZnOxNy | Sn | 51.1 | 50.54 | 10.01 | 39.45 | 280 | 64 | 36 |
| | | Zr | 54.8 | 53.14 | 8.94 | 37.92 | 290 | 98 | 44 |
| | | FMP | 57.3 | 53.67 | 10.09 | 36.23 | 310 | 63 | 38 |
| 89 | SnOx ZnOxNy | Sn | 50.5 | 49.26 | 9.69 | 41.05 | 230 | 91 | 43 |
| | | Zr | 54.3 | 54.06 | 8.77 | 37.17 | 210 | 98 | 46 |
| | | FMP | — | 53.18 | 9.32 | 37.50 | 250 | 60 | 42 |
| 90 | SnOx ZnOxNy | Sn | 50.0 | 50.81 | 11.53 | 37.66 | 210 | 96 | 44 |
| | | Zr | 53.2 | 53.15 | 10.76 | 36.09 | 200 | 96 | 44 |
| | | FMP | 54.6 | 52.86 | 11.77 | 35.37 | 260 | 71 | 43 |
| 91 | SnOx ZnOxNy | Sn | 49.9 | 50.43 | 12.28 | 37.30 | 230 | 91 | 46 |
| | | Zr | 52.7 | 53.05 | 10.98 | 35.97 | 200 | 96 | 43 |
| | | FMP | 54.2 | 53.22 | 12.09 | 34.69 | 220 | 74 | 43 |
| 92 | SiCHx ZrOxNy | SiC | 46.2 | 45.92 | 9.39 | 44.69 | 200 | 93 | 50 |
| | | Zr FMP | | | | | | | |
| 93 | SiCHx ZrOxNy | SiC | 46.2 | 45.90 | 10.39 | 43.71 | 185 | 93 | 50 |
| | | Zr FMP | | | | | | | |
| 94 | SiCHx ZrOxNy | SiC | 48.5 | 47.80 | 9.20 | 43.00 | 200 | 73 | 47 |
| | | Zr FMP | | | | | | | |
| 95 | TaNy | Ta FMP | 49.9 | 50.26 | 11.07 | 38.66 | 200 | 100 | 50 |
| 96 | TaOxNy | Ta FMP | 49.3 | 49.30 | 12.54 | 38.16 | 180 | 100 | 50 |
| 97 | TaOxNy | Ta FMP | 50.0 | 49.82 | 12.75 | 37.44 | 180 | 95 | 48 |
| 98 | TaOxNy | Ta FMP | 48.9 | — | — | — | — | — | — |

TABLE-continued

| | | | | | | | | | |
|---|---|---|---|---|---|---|---|---|---|
| 99 | InOx | In | 50.3 | 47.69 | 10.18 | 42.14 | 290 | 74 | 46 |
| | | FMP | 58.6 | 51.70 | 8.82 | 39.48 | 270 | 58 | 40 |
| 100 | InOx | In | 50.6 | 48.17 | 9.81 | 42.02 | 310 | 66 | 42 |
| | | FMP | 58.5 | 55.43 | 8.75 | 35.82 | 260 | 55 | 42 |
| 101 | InOx | In | 50.2 | 48.56 | 10.70 | 40.73 | 270 | 76 | 47 |
| | | FMP | 56.7 | 54.86 | 9.46 | 35.68 | 240 | 59 | 43 |
| 102 | InOx | In | 49.8 | 48.82 | 11.42 | 39.76 | 240 | 81 | 48 |
| | | FMP | 57.1 | 54.83 | 9.69 | 35.48 | 260 | 56 | 43 |
| 103 | TiOxNy | Ti | 50.7 | 49.77 | 12.65 | 37.58 | 200 | 84 | 49 |
| | | FMP | | | | | | | |
| 104 | TiOxNy | Ti | 50.2 | 50.79 | 14.01 | 35.21 | 220 | 60 | 43 |
| | | FMP | | | | | | | |
| 105 | ZrNx | Zr | 50.8 | 51.43 | 11.16 | 37.41 | 200 | 89 | 52 |
| | | FMP | | | | | | | |
| 106 | ZrNx | Zr | 48.5 | 48.72 | 13.10 | 38.18 | 190 | 89 | 51 |
| | | FMP | | | | | | | |
| 107 | ZrOx | Zr | 52.8 | 47.94 | 13.21 | 38.85 | 210 | 39 | 44 |
| | | FMP | | | | | | | |
| 108 | ZrOx | Zr | 44.4 | 43.45 | 14.30 | 42.25 | 210 | 30 | 46 |
| | | Zr | | 51.38 | 12.01 | 36.61 | 230 | 33 | 43 |
| | | FMP | | | | 37.29 | | | |
| 109 | ZrOx | Zr | 52.8 | 50.22 | 12.49 | 36.43 | 210 | 98 | 46 |
| | | FMP | 56.2 | 51.86 | 11.71 | 35.72 | 260 | 65 | 41 |
| 110 | ZrOx | Zr | 49.6 | 47.60 | 16.68 | 35.43 | 220 | 98 | 46 |
| | | FMP | 53.8 | 48.32 | 16.25 | 34.82 | 280 | 71 | 40 |
| 111 | ZrOx | Zr | 50.4 | 49.56 | 15.62 | 33.36 | 260 | 87 | 46 |
| | | FMP | 53.1 | 51.61 | 15.03 | | 280 | 58 | 42 |
| 112 | ZrOxNy | Zr | 49.1 | 48.79 | 7.14 | 44.06 | 170 | — | — |
| | | FMP | | | | | | | |
| 113 | ZrOxNy | Zr | 48.7 | 48.65 | 9.54 | 41.80 | 210 | 102 | 49 |
| | | FMP | 58.5 | 54.60 | 10.03 | 35.37 | 260 | 64 | 46 |
| 114 | ZrOxNy | Zr | 47.5 | 48.48 | 10.77 | 40.75 | 210 | 100 | 51 |
| | | FMP | 58.3 | 55.13 | 10.04 | 34.84 | 260 | 53 | 42 |
| 115 | ZrOxNy | Zr | 45.0 | 46.11 | 15.47 | 38.42 | 190 | 98 | 49 |
| | | FMP | 54.9 | 51.54 | 14.40 | 34.06 | 245 | 64 | 41 |
| 116 | ZrOxNy | Zr | 50.2 | 47.83 | 14.71 | 37.46 | 200 | 100 | 44 |
| | | FMP | 51.7 | 44.66 | 18.55 | 36.79 | 205 | 74 | 45 |
| 117 | ZrOxNy | Zr | 51.1 | 51.31 | 11.58 | 37.11 | 190 | 93 | 49 |
| | | FMP | | | | | | | |
| 118 | ZrOxNy | Zr | 42.2 | 44.63 | 11.53 | 43.84 | 190 | 100 | 50 |
| | | FMP | | | | | | | |
| 119 | ZrOxNy | Zr | 50.1 | 44.99 | 10.49 | 39.52 | 190 | 102 | 50 |
| | | FMP | | | | | | | |
| 120 | ZrOxNy | Zr | 48.4 | 46.22 | 10.02 | 43.76 | 200 | 100 | 43 |
| | | FMP | | | | | | | |
| 121 | ZrOxNy | Zr | 51.1 | 50.70 | 10.52 | 38.78 | 200 | 100 | 49 |
| | | FMP | | | | | | | |
| 122 | ZrOxNy | Zr | 50.8 | 47.10 | 8.81 | 44.09 | 220 | 100 | 46 |
| | | FMP | | | | | | | |
| 123 | ZrOxNy | Zr | 52.0 | 52.82 | 9.97 | 37.20 | 220 | 100 | 51 |
| | | FMP | | | | | | | |
| 124 | ZrOxNy | Zr | 51.5 | 51.17 | 10.85 | 37.98 | 200 | 100 | 51 |
| | | FMP | | | | | | | |

What is claimed is:

1. A method for producing an optical storage medium comprising:
   a. sputter-depositing a laser recordable thin reflective layer of reflective metal onto at least one surface of a substrate, and
   b. sputter-depositing over the thin laser recordable reflective layer an overcoating layer comprising one or more transparent inorganic materials selected from the group consisting of a nitride or oxynitride of Zr, Hf and Ta to a reflectivity at 830 nm of from 40 to 80%, and
   c. sputter depositing a second overcoating layer consisting of silicon carbohydride over the first overcoating layer.

2. The method of claim 1 wherein prior to step (a) the substrate is treated with a glow discharge.

3. The method of claim 1 wherein in step (a), the sputter-depositing is carried out in the presence of oxidant gas to deposit a thin reflective layer of a partial oxide of the reflective metal.

4. A method for producing an optical storage medium comprising
   a. sputter-depositing a laser recording thin reflective layer of reflective metal onto at least one surface of a substrate, and
   b. reactively sputtering one or more metals selected from the group consisting of zirconium, tantalum, and hafnium in the presence of a reactant gas source selected from the group consisting of nitrogen or a mixture of oxygen and nitrogen thereby depositing over the thin reflective layer a thin transparent overcoating layer to reflectivity at 830 nm of from 40 to 80%, and
   c. reactively sputtering a second overcoating layer over said first overcoating layer by reactively sputtering silicon carbide in the presence of hydrogen.

5. The method of claim 1 wherein the reflective layer of reflective metal is an alloy comprising: at least about 8 percent tin, at least about 8 percent bismuth and at least about 1 percent of at least one of Mg, Au, Fe, Cr, Mn, Cu, Ag and Ni wherein bismuth is present in an amount greater than any of Mg, Au, Fe, Cr, Mn, Cu, Ag and Ni.

6. The method of claim 4 wherein the thin reflective layer of reflective metal is an alloy comprising: at least about 8 percent tin, at least about 8 percent bismuth and at least about 1 percent of at least one of Mg, Au, Fe, Cr, Mn, Cu, Ag and Ni wherein bismuth is present in an amount greater than any of Mg, Au, Fe, Cr, Mn, Cu, Ag and Ni.

* * * * *